US010223384B2

(12) United States Patent
Ono

(10) Patent No.: US 10,223,384 B2
(45) Date of Patent: Mar. 5, 2019

(54) DRIVE RECORDER

(71) Applicant: FUJITSU TEN LIMITED, Kobe-shi, Hyogo (JP)

(72) Inventor: Kohei Ono, Kobe (JP)

(73) Assignee: FUJITSU TEN Limited, Kobe-shi (JP)

(*) Notice: Subject to any disclaimer, the term of this patent is extended or adjusted under 35 U.S.C. 154(b) by 316 days.

(21) Appl. No.: 15/158,910

(22) Filed: May 19, 2016

(65) Prior Publication Data
US 2016/0350298 A1 Dec. 1, 2016

(30) Foreign Application Priority Data

May 29, 2015 (JP) ................................. 2015-110128

(51) Int. Cl.
B60R 1/00 (2006.01)
G07C 5/00 (2006.01)
G07C 5/02 (2006.01)
G07C 5/08 (2006.01)
H04N 5/77 (2006.01)
H04N 9/82 (2006.01)
G06F 17/30 (2006.01)

(52) U.S. Cl.
CPC ............ *G06F 17/3028* (2013.01); *B60R 1/00* (2013.01); *G07C 5/008* (2013.01); *G07C 5/02* (2013.01); *G07C 5/085* (2013.01); *G07C 5/0808* (2013.01); *H04N 5/77* (2013.01); *H04N 9/8205* (2013.01); *B60R 2300/50* (2013.01)

(58) Field of Classification Search
CPC ........ G07C 5/008; G07C 5/02; G07C 5/0808; G07C 5/085; G06F 17/3028; H04N 5/77; B60R 1/00; B60R 2300/50
See application file for complete search history.

(56) References Cited

U.S. PATENT DOCUMENTS

2003/0108327 A1* 6/2003 Sunagawa ........ G08B 13/19667
386/226
2006/0132602 A1* 6/2006 Muto ........................ H04N 7/18
348/148

(Continued)

FOREIGN PATENT DOCUMENTS

EP 2804152 A1 * 11/2014 ....... G08B 13/19647
JP 2009-141550 A 6/2009

(Continued)

*Primary Examiner* — Huy T Nguyen
(74) *Attorney, Agent, or Firm* — Oliff PLC

(57) ABSTRACT

A drive recorder sends to a server a moving image file showing a situation of surroundings of vehicle in a moment at which large acceleration occurred. The server determines, based on moving image file, whether or not to prohibit from being overwritten moving image file showing surroundings of vehicle in a moment at which an event occurred. Based on a determination result determined by the server, the drive recorder prohibits from being overwritten an image data set showing the moment 1) at which the event occurred or 2) optionally before and/or after the event occurred including the moment at which the event occurred. Thus, the drive recorder can surely prohibit the image data set to be prohibited from being overwritten. Moreover, it is possible to effectively use a storage area of a memory by allowing overwriting image data set that does not necessarily need to be prohibited from being overwritten.

12 Claims, 11 Drawing Sheets

(56) References Cited

U.S. PATENT DOCUMENTS

2010/0103265 A1    4/2010  Yu et al.
2010/0259373 A1*  10/2010  Chang .................. G07C 5/0891
                                                340/438

FOREIGN PATENT DOCUMENTS

| JP | 2011-123720 A | 6/2011 |
| JP | 2011-221811 A | 11/2011 |
| JP | 2012-048606 A | 3/2012 |
| JP | 2013-182573 A | 9/2013 |

\* cited by examiner

| | ADDRESS | OVERWRITING-PROHIBITING TYPE | G VALUE |
|---|---|---|---|
| 32bL | 2999 | ABSOLUTE PROHIBITION | 15 |
| 32bL | 0032 | ABSOLUTE PROHIBITION | 12 |
| 32bL | 1982 | ABSOLUTE PROHIBITION | 5 |
| 32bL | 0604 | ABSOLUTE PROHIBITION | 5 |
| 32bL | 0022 | ABSOLUTE PROHIBITION | 2 |
| 32bL | 0002 | NORMAL PROHIBITION | 8 |
| 32bL | 1413 | NORMAL PROHIBITION | 8 |
| 32bL | 1122 | NORMAL PROHIBITION | 7.5 |
| 32bL | 3000 | NORMAL PROHIBITION | 5 |
| 32bL | 1113 | NORMAL PROHIBITION | 4 |
| 32bL | 1926 | NORMAL PROHIBITION | 4 |
| 32bL | 2011 | NORMAL PROHIBITION | 4 |
| 32bL | 0004 | NORMAL PROHIBITION | 3.5 |

AD = ADDRESS column; PD = OVERWRITING-PROHIBITING TYPE column; GD = G VALUE column; AR = absolute prohibition rows; OR = normal prohibition rows; table 32b.

FIG.6

ND RECORDER

BACKGROUND OF THE INVENTION

Field of the Invention

The invention relates to a technology for processing moving images captured on a moving object.

Description of the Background Art

Conventionally, a drive recorder that continuously captures images of a situation in front of a vehicle and that stores image data of the captured images cyclically on a memory, is well known. The drive recorder prohibits image data recorded before and after a large acceleration caused by a sudden braking, from being overwritten to use the stored image for later verification.

Only a predetermined portion of a storage area is prohibited from being overwritten so as to ensure a cyclical storage area for the image data. Therefore, if a larger acceleration occurs, even the image data prohibited from being overwritten is overwritten with image data relating to the larger acceleration and is stored.

However, some of traffic accidents and the like are caused by vehicles without an occurrence of a large acceleration because drivers of the vehicles did not apply a sudden braking. In such a case, the recorded image data shows a moment of a traffic accident. However, since being overwritten with image data relating to occurrence of a larger acceleration, the recorded image data cannot be used for later verification.

Some among the image data cannot be used for verification even if the image data was recorded before and after occurrence of a large acceleration, due to a defect of camera installation and the like. In such a case, if the recorded image data is set as image data prohibited from being overwritten, the recorded image data unnecessarily occupies the limited storage area and thus causes a technical problem.

SUMMARY OF THE INVENTION

According to one aspect of the invention, a drive recorder temporally continuously records and stores image data sets into a memory. Each of the image data sets shows surroundings of a vehicle. The drive recorder includes a microcomputer configured to function as: an acquiring part that sequentially acquires the image data sets; a recorder that overwrites one of a plurality of the image data sets previously stored in the memory with a newly acquired image data set newly acquired by the acquiring part to store the newly acquired image data set into the memory, the one image data set having been designated as not prohibited from being overwritten; a detector that detects whether there was an occurrence of an event in association with the newly acquired image data set; a sender that, when the occurrence of the event is detected to have occurred in association with the newly acquired image data set, sends situation data showing 1) a situation in a moment at which the event occurred or 2) a situation optionally before and/or after the event occurred including the moment at which the event occurred, to an external apparatus; a receiver that receives, from the external apparatus, a determination result determined by the external apparatus based on the situation data, the determination result indicating whether or not to prohibit the newly acquired image data set from being overwritten; and a prohibiting part that prohibits the newly acquired image data set from being overwritten in the future, based on the determination result.

Thus, the image data set to be prohibited from being overwritten can be surely prohibited from being overwritten.

According to another aspect of the invention, the situation data includes at least one of an acceleration, a speed and a location of the vehicle 1) in the moment at which the event occurred or 2) optionally before and/or after the event occurred including the moment at which the event occurred.

Thus, it is possible to improve accuracy of a determination about whether or not to prohibit the image data set from being overwritten.

According to another aspect of the invention, the situation data includes the newly acquired image data set.

Thus, it is possible to visually make the determination about whether or not to prohibit the image data set from being overwritten.

Therefore, an object of the invention is to provide a technology for appropriately recording and storing an image data set.

These and other objects, features, aspects and advantages of the invention will become more apparent from the following detailed description of the invention when taken in conjunction with the accompanying drawings.

BRIEF DESCRIPTION OF THE DRAWINGS

FIG. 6 illustrates an example of an overwriting-prohibiting list;

DESCRIPTION OF THE EMBODIMENTS

An embodiment of the invention will be described below with reference to the drawings.

1. First Embodiment

<1-1. Outline>

Figure 1:
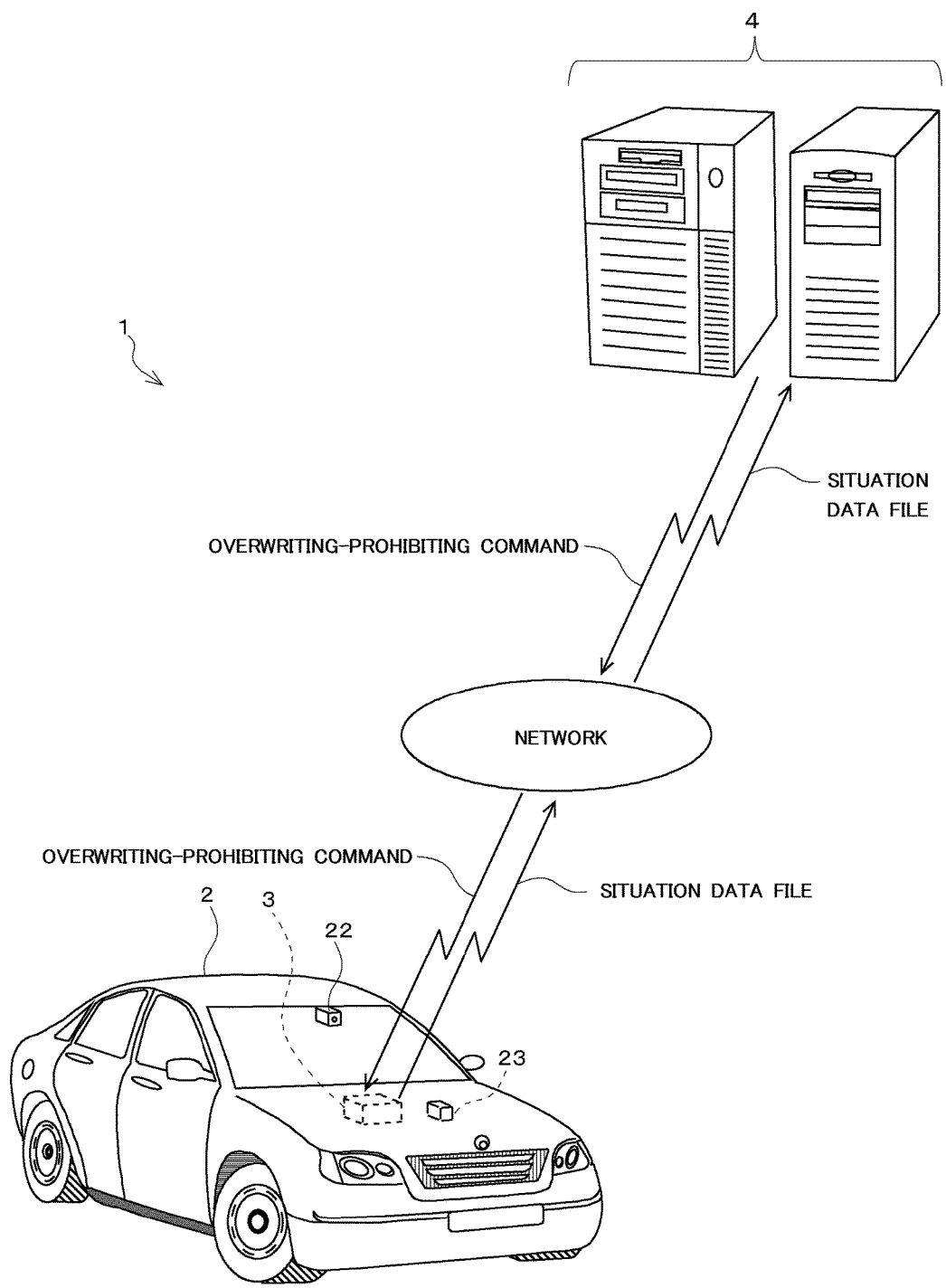
FIG. 1 illustrates an outline of a data recording system.

FIG. 1 illustrates an outline of a data recording system 1. The data recording system 1 includes a drive recorder 3 that is mounted on a vehicle 2 and a server 4 that is provided outside the vehicle 2.

The vehicle 2 includes a camera 22 that captures images of an area in front of the vehicle 2 and an acceleration sensor 23 that detects an acceleration that occurs to the vehicle 2. The camera 22 and the acceleration sensor 23 are configured to be connected to the drive recorder 3.

The drive recorder 3 continuously stores into a memory a moving image file acquired by the camera 22 capturing the images while a start switch (e.g. an ACC (accessory switch)) of the vehicle 2 is being ON. A moving image of approx. 10 seconds is stored in one moving image file. When recording the moving image files into an entire storage area of the memory, the drive recorder 3 overwrites an oldest recorded moving image file with a latest moving image file and stores the latest moving image file.

When a large acceleration (so-called "event") occurs due to a sudden braking, an impact, etc. to the vehicle 2, the drive recorder 3 identifies an occurrence of the acceleration as an incident (so-called "trigger") and stores the moving image file of a moving image captured for a few ten seconds before and after the acceleration occurred, as a moving image file that is prohibited from being overwritten (hereinafter referred to as "overwriting-prohibited moving image file"). The moving image file is stored as the overwriting-prohibited moving image file because a user verifies a cause of the occurrence of the acceleration later.

However, a memory capacity used to store the overwriting-prohibited moving image files is limited to a predetermined capacity to prevent all the capacity of the memory from being used to store the overwriting-prohibited moving image files.

Therefore, only moving image files that should not be overwritten truly need to be prohibited from being overwritten. Therefore, the occurrence of the acceleration should not be a single factor for prohibiting from being overwritten, but it is recommended to verify contents of the moving image. In other words, even in a case where a large acceleration occurred, if the stored moving image does not include a situation to be verified, the moving image does not have to be prohibited from being overwritten because the unnecessary moving image file only consumes the limited memory capacity. On the other hand, even in a case where a small acceleration occurred, if the moving image shows a very moment of a collision accident, the moving image is very important for later verification.

Triggered by an occurrence of a predetermined level of an acceleration, the drive recorder 3 in this embodiment sends to the server 4, via a network, the moving image files of moving images captured and acquired before and after the acceleration occurred. At that time, in addition to the moving image files, the drive recorder 3 puts data relating to a situation change that occurred to the vehicle 2, such as an acceleration, into a situation data file and then sends the situation data file to the server 4. The server 4 analyzes each of the moving images sent from the drive recorder 3 to determine whether or not the sent moving images include an image showing a moment of a collision accident and the like. In other words, the server 4 determines whether or not each of the sent moving images should be truly prohibited from being overwritten. Then, in a case where the server 4 determines that the moving image should be prohibited from being overwritten, the server 4 sends an overwriting-prohibiting command to the drive recorder 3.

Once receiving the overwriting-prohibiting command, the drive recorder 3 prohibits the corresponding moving image file and stores the moving image file. Thus, only moving images that should be truly prohibited from being overwritten are prohibited. Moreover, the server 4, a large-scale computing apparatus, performs analysis of the moving images that requires high computational power. Thus, it is possible to rapidly and accurately determine whether or not the moving images should be prohibited from being overwritten. Generally, processing capability of a computing apparatus installed in the drive recorder 3 is not so high that the computing apparatus in the drive recorder 3 cannot analyze the moving images rapidly. Therefore, it is recommended that the server 4, the large-scale computing apparatus, should analyze the moving images captured by the drive recorder 3. A value of an acceleration that occurred to the vehicle 2 is hereinafter also referred to as "G value."

<1-2. Configuration>

Figure 2:
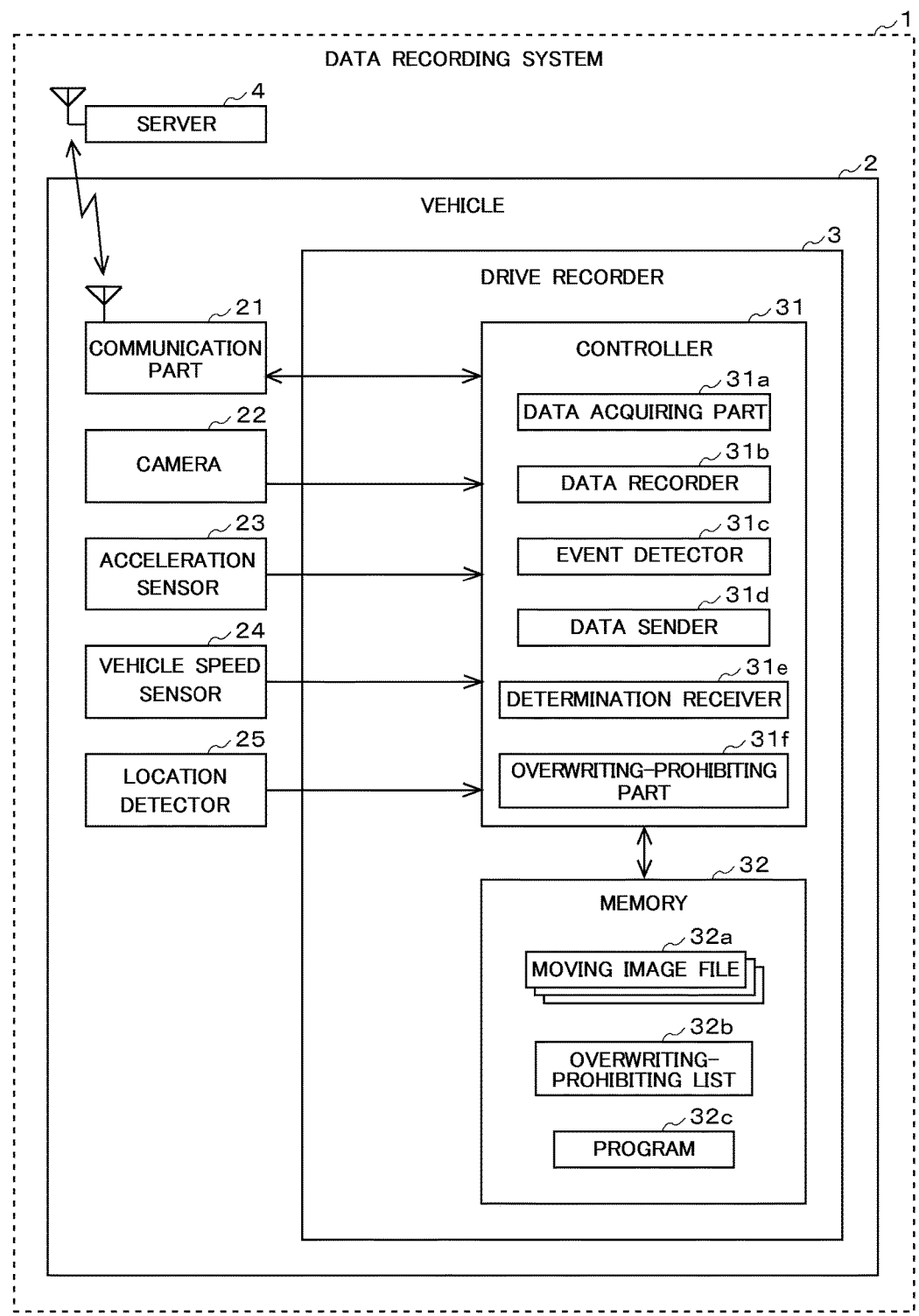
FIG. 2 illustrates a configuration of a drive recorder.

FIG. 2 illustrates a block diagram showing a configuration of the drive recorder 3. The drive recorder 3 is configured to be mounted on the vehicle 2 that is included in the data recording system 1. The drive recorder 3 includes a controller 31 and a memory 32. The vehicle 2 in which the drive recorder 3 is installed includes a communication part 21, the camera 22, the acceleration sensor 23, a vehicle speed sensor 24 and a location detector 25. The communication part 21, the camera 22, the acceleration sensor 23, the vehicle speed sensor 24 and the location detector 25 are connected to the drive recorder 3, respectively.

The controller 31 is a microcomputer including a CPU (central processing unit), a RAM (random access memory) and a ROM (read only memory). The controller 31 controls the entire drive recorder 3. Functions of the controller 31 will be described later.

The memory 32 is a storage medium (or recording medium) that stores (records) data. The memory 32 is a non-volatile memory, such as an EEPROM (electrical erasable programmable read-only memory), a flash memory and a hard disk drive including a magnetic disk. The memory 32 stores a moving image file 32a, an overwriting-prohibiting list 32b and a program 32c.

The moving image file 32a is, for example, a DAT (digital audio tape) moving image data set (hereinafter referred to simple as "moving image data") based on data of a plurality of still images captured by the camera 22 in a predetermined time cycle. A plurality of the moving image files 32a, for example, up to 3000 files, are stored in the memory 32. Moving image data captured for 10 seconds is stored in each file. An arrangement structure of each of the plurality of the moving image files 32a in the memory 32 will be described later. Each moving image file 32a includes audio data, in addition to the moving image data, and a signal for synchronizing the moving image data and the audio data. Moreover, the moving image file 32a functions as the image data of this invention. In a case where the image data of this invention is defined as data of one or a plurality of still images, it is recommended to define that image data should be the data of at least one still image captured exactly or around a time when the G value increases or decreases most because the still image is considered to show most clearly a situation of an incident that occurred to the vehicle 2.

The overwriting-prohibiting list 32b is a matrix data table including addresses and overwriting-prohibiting types (absolute prohibition or normal prohibition) of the overwriting-prohibited moving image files, and the G values that occurred while the images were being captured. When the overwriting-prohibiting list 32b is looked up, the addresses and the overwriting-prohibiting types of the moving image files and levels of the G values that occurred while the images were being captured can be acquired. A configuration of the overwriting-prohibiting list 32b will be described later.

The program 32c is read out by the controller 31. The program 32c is a firmware that the controller 31 executes to control the drive recorder 3. The program 32c is input or output to/from the drive recorder 3 via a storage medium, such as a memory card, or via connection to an external apparatus. The program 32c may be stored beforehand in the RAM in the foregoing controller 31.

Next, the functions included in the foregoing controller 31 will be described. The controller 31 includes a data acquiring part 31a, a data recorder 31b, an event detector 31c, a data sender 31*d*, a determination receiver 31*e* and an overwriting-prohibiting part 31*f*. A function of each part can be realized by the controller 31 executing the program 32*c*.

The data acquiring part 31*a* acquires the data of the plurality of still images (hereinafter referred to simply as "still image data") from the camera 22 and then generates the moving image file. Moreover, the data acquiring part 31*a* acquires acceleration data from the acceleration sensor 23, vehicle speed data from the vehicle speed sensor 24, location data from the location detector 25 and the address of the moving image file from the memory 32, and then generates the situation data file. Therefore, the situation data file includes the moving image file and at least one of the acceleration, the vehicle speed, the location and the address. The data acquiring part 31*a* functions as an obtaining part. Moreover, the situation data file functions, as situation data showing 1) a situation in a moment at which the event occurred or 2) a situation optionally before and/or after the event occurred including the moment at which the event occurred.

The data recorder 31*b* stores the moving image file generated by the data acquiring part 31*a* into an address that is not prohibited being overwritten, of the memory 32. When the data acquiring part 31*a* newly acquired the image data, the data recorder 31*b* stores the newly acquired image data in the memory. The data recorder 31*b* functions as a recording part.

The event detector 31*c* calculates, based on the acceleration data sent from the acceleration sensor 23, the G value that occurred to the vehicle 2. Then, the event detector 31*c* compares the G value with a predetermined threshold value to detect whether or not the event occurred that should cause the moving image file to be prohibited from being overwritten. In other words, in a case where the G value that occurred to the vehicle 2 is greater than the threshold value, the event detector 31*c* determines that the event occurred. Herein, an event may be an occurrence of a G value greater than a predetermined value, an occurrence of an impact, a drop of a vehicle speed, deployment of an airbag, approach of an object or another incidence that occurs to the vehicle 2. The event detector 31*c* functions as an event detecting part.

The data sender 31*d* sends the situation data file generated by the data acquiring part 31*a*, to the server 4 via the communication part 21. The situation data file sent by the data sender 31*d* includes data that occurred to the vehicle 2 in the moment at which the event occurred and/or before and after the event. Data in the moment at which the event occurred and/or before and after the event is sent as the situation data file so that the situation change that occurred to the vehicle 2 can be examined more in detail. The data sender 31*d* functions as a transmitting part.

The determination receiver 31*e* receives a signal sent to the drive recorder 3 from the server 4. Especially, the determination receiver 31*e* receives the overwriting-prohibiting command that is a determination result indicating whether or not to prohibit a specific moving image file from being overwritten. The determination receiver 31*e* functions as a receiver.

The overwriting-prohibiting part 31*f* prohibits the moving image file generated in the moment at which the event occurred and/or before and after the event, from being overwritten. The overwriting-prohibiting part 31*f* prohibits the moving image file from being overwritten by a flag operation to the storage area of the memory 32. In other words, when the overwriting-prohibiting part 31*f* turns on an overwriting-prohibiting flag, the moving image file stored in the address is prohibited from being overwritten. On the other hand, when the overwriting-prohibiting part 31*f* turns off the overwriting-prohibiting flag, the prohibition of overwriting the moving image file is cancelled. Moreover, the overwriting-prohibiting part 31*f* absolutely prohibits the moving image file specified by the overwriting-prohibiting command from being overwritten, based on the overwriting-prohibiting command received by the determination receiver 31*e*. The overwriting-prohibiting part 31*f* updates a corresponding portion of the overwriting-prohibited file list to set the moving image file to absolute overwriting prohibition. In a case where the moving image file is absolutely prohibited from being overwritten, even if a moving image file is generated later when a larger G value occurs, the absolute overwriting-prohibited moving image file is not be overwritten. Since the moving image file is absolutely prohibited from being overwritten as a result of analysis of contents of the moving image file, it is regarded as a very important moving image file for later verification. The overwriting-prohibiting part 31*f* functions as a prohibiting part.

Next, each function installed in the vehicle 2 will be described. The communication part 21 communicates data to/from the server 4 via the network. The communication part 21 is, for example, a wireless communication device, using WiMAX (worldwide interoperability for microwave access), LTE (long term evolution) and the like.

The camera 22 is a video camera including CCD (charge coupled device) image sensor or CMOS (complementary metal oxide semiconductor) image sensor. The camera 22 is installed with an optical axis thereof directed in front of the vehicle 2, in a vehicle cabin of the vehicle 2. The camera 22 is activated in association with a startup switch of the vehicle 2 (e.g. accessory switch or ACC), and continuously captures images of the situation in front of the vehicle 2. The plurality of the still images captured by the camera 22 are sent to the drive recorder 3. The drive recorder 3 generates the moving image file based on the data of the plurality of the still images sent by the camera 22.

The acceleration sensor 23 is a three-axis acceleration sensor for measuring accelerations of the vehicle 2 in a front-back direction, a horizontal direction and a vertical direction. Once measuring the acceleration that occurred to the vehicle 2, the acceleration sensor 23 sends data of the acceleration to the drive recorder 3.

The vehicle speed sensor 24 acquires the vehicle speed of the vehicle 2. Once acquiring the vehicle speed of the vehicle 2, the vehicle speed sensor 24 sends data of the vehicle speed to the drive recorder 3.

The location detector 25 detects a current location of the vehicle 2, using a satellite positioning system, such as GPS. Once detecting the current location of the vehicle 2, the location detector 25 sends the data of the current location to the drive recorder 3.

Figure 3:
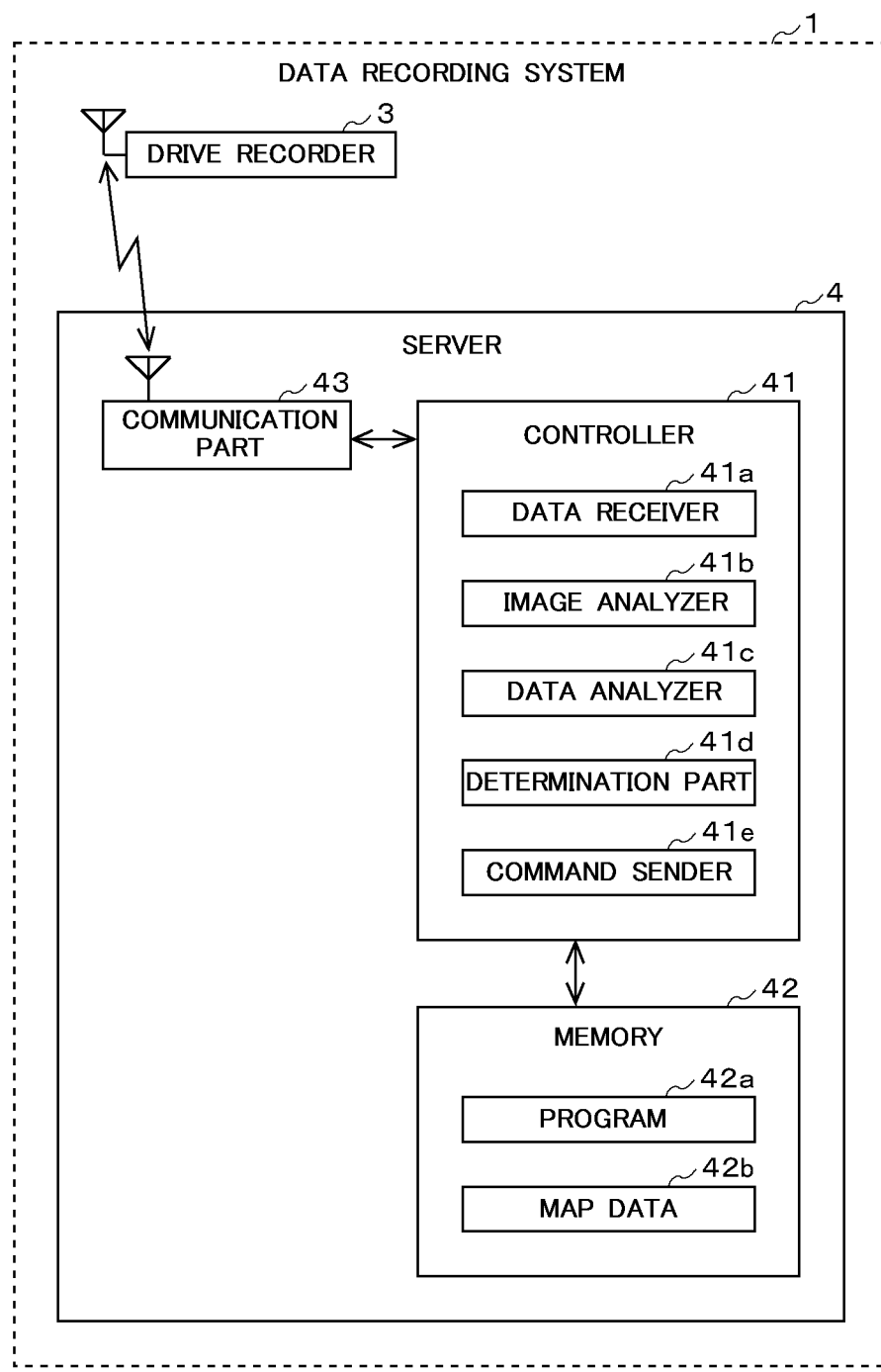
FIG. 3 illustrates a configuration of a server.

Next, a configuration of the server 4 will be described. FIG. 3 illustrates a block diagram showing the configuration of the server 4. The server 4 is installed outside the vehicle 2 and is the large-scale computing apparatus connected to the drive recorder 3 via the network. The server 4 includes a controller 41, a memory 42 and a communication part 43. The server 4 functions as an external apparatus.

The controller 41 is a microcomputer including a CPU, a RAM and a ROM. It is recommended that the controller 41 should include a plurality of high performance CPUs and the like because it is preferable that a large-scale calculation should be performed rapidly in the server 4. The controller 41 includes a data receiver 41*a*, an image analyzer 41*b*, a data analyzer 41*c*, a determination part 41*d* and a command sender 41e. Functions of those parts are realized by the controller 41 executing a program 42a.

The data receiver 41a receives the situation data file sent from the drive recorder 3 via the communication part 43.

The image analyzer 41b analyzes images in the moving image file included in the situation data file. Especially, the image analyzer 41b analyzes presence or absence of an image showing a traffic accident and the like of the vehicle 2 because in a case where the vehicle 2 caused an accident or was involved in an accident, the moving image file should be prohibited from being overwritten. The image analyzer 41b analyzes the moving image file, using, for example, a well-known pattern matching method. In other words, The image analyzer 41b memorizes beforehand pattern images relating to traffic accidents, such as a rollover of a vehicle, falling down of a person and damage of a front windshield or a vehicle body, and in a case where the moving image file is matched with at least one of the pattern images, the image analyzer 41b determines that the moving image file includes the image showing a traffic accident and the like.

Such an image analysis requires extremely large processing load so that it is recommended that a large-scale computing apparatus, like a server, should perform the analysis because the large-scale computing apparatus can analyze the images rapidly. A computing apparatus included in a vehicle-mounted drive recorder generally does not include a processing capability high enough to process the images rapidly. Therefore, the moving image file is sent from the drive recorder to the server and the server analyzes the images. Thus, the images can be analyzed rapidly and accurately. Then, the drive recorder can fast perform a process for prohibiting the moving image file from being overwritten (overwriting-prohibiting process).

Based on sensor data in the situation data file, the data analyzer 41c analyzes an incident that occurred to the vehicle 2. The sensor data is, as described above, the G value, the vehicle speed and the position data of the vehicle 2. The data analyzer 41c analyzes: a sharp increase or decrease of the G value and the vehicle speed of the vehicle 2; whether or not the vehicle 2 was located in an accident-prone location, such as a traffic intersection and an area where an accident often happens; and the like.

The determination part 41d determines whether or not the received moving image file should be absolutely prohibited from being overwritten, based on a matching degree between the received moving image file and the pattern images and on levels of the values of the sensor data.

In a case where the determination part 41d determines that the moving image file should be absolutely prohibited from being overwritten, the command sender 41e generates a command (the overwriting-prohibiting command) representing that the drive recorder 3 should absolutely prohibit the moving image file from being overwritten, and then sends the generated command to the drive recorder 3. The command includes both a name of the moving image file and an address thereof in the memory 32. An error made by the drive recorder 3 can be prevented by looking up the name and the address. In other words, in a case where the moving image file is overwritten from a time point at which the situation data file is sent to the server 4 to a time point at which the drive recorder 3 receives the overwriting-prohibiting command, if the drive recorder 3 receives only the address, the overwritten and stored moving image file (a moving image file that actually should not be absolutely prohibited, from being overwritten) is absolutely prohibited from being overwritten and thus inconvenience occurs.

The memory 42 is a storing medium (or recording medium) that stores (records) data. The memory 42 is, for example, a non-volatile memory, such as an EEPROM (Electrical Erasable Programmable Read-Only Memory), a flash memory and a hard disk drive including a magnetic disk. The memory 42 stores the program 42a and map data 42b.

The program 42a is firmware that is read out and executed by the controller 41 to control the server 4. Moreover, the program 42a includes software for image processing.

The map data 42b is geographical data relating to roads including traffic intersections, sites, such as parks, and locations and names of buildings and other structures specified by longitude and latitude. The map data 42b includes data of the accident-prone locations.

The communication part 43 is a communicating device that communicates data to/from the drive recorder 3 via the network. The communication part 43 is, for example, a wireless communication device, using WiMAX (Worldwide Interoperability for Microwave Access), LTE (Long Term Evolution) and the like.

<1-3. Moving Image File and Situation Data File>

Figure 4:
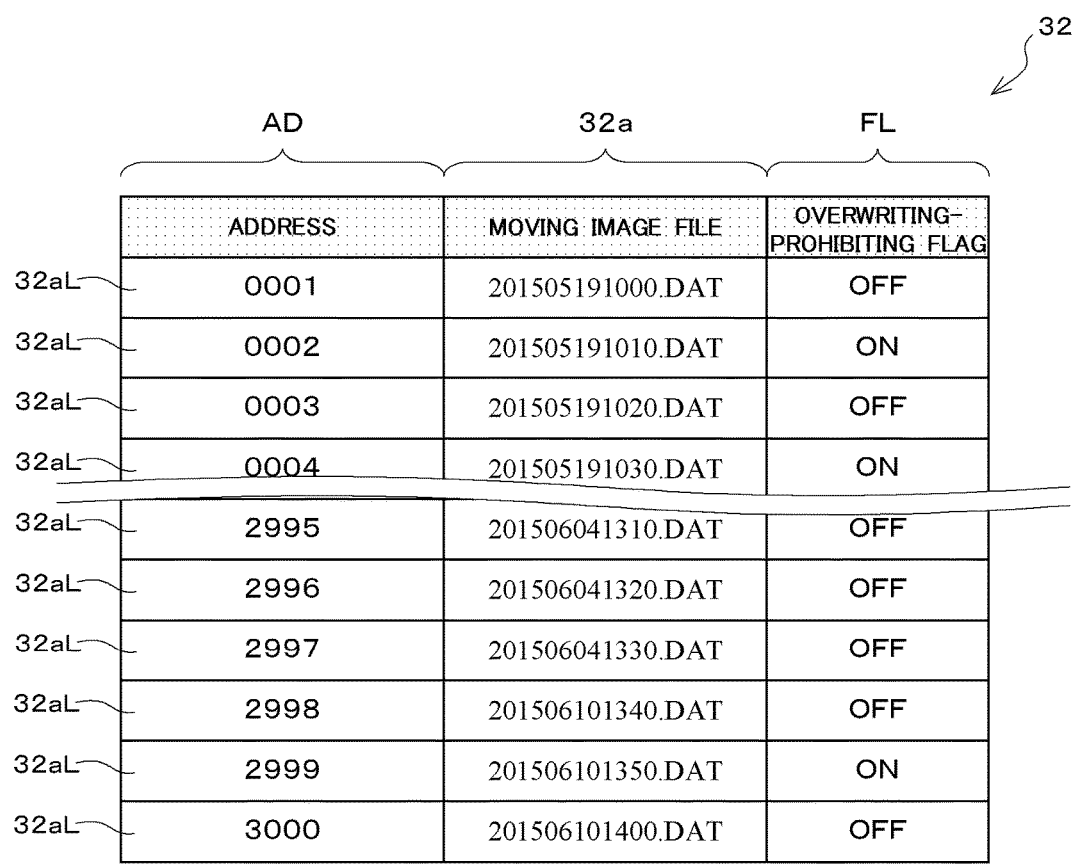
FIG. 4 illustrates an arrangement structure of a moving image file in a memory.

Next, the arrangement structure of the moving image file will be described. FIG. 4 illustrates the arrangement structure of the moving image file 32a in the memory 32. The storage area of the memory 32 in which the moving image file 32a is stored include a plurality of records 32aL. A total number of the plurality of records 32aL is, for example, 3,000 records. Each of the plurality of records 32aL includes a data area for an address AD, a moving image file FA and an overwriting-prohibiting flag FL.

The address AD is an identifier showing a location of the storage area of the memory 32 in which the moving image file is stored. The address AD is shown in numbers, for example, "0001" and "0002."

One moving image file 32a is stored in one of the plurality of records 32aL. The moving image file 32a is stored after being given with a file name including a year, a date and hours at which the moving image file 32a was generated.

The overwriting-prohibiting flag FL is an identifier having a value of ON or OFF. In a case where the overwriting-prohibiting flag FL of one of the plurality of records 32aL is turned ON, the moving image file 32a located in a location of the one record 32aL is prohibited from being overwritten. In a case where the overwriting-prohibiting flag FL of one of the plurality of records 32aL is turned OFF, the moving image file 32a located in a location of the one record 32aL is allowed to be overwritten. Since the overwriting-prohibiting flag FL only shows ON or OFF, in a case where the overwriting-prohibiting flag FL is ON, it is not distinguishable whether the moving image file 32a is absolutely prohibited. When the overwriting-prohibiting flag FL of the moving image file 32a is ON, whether or not the moving image file 32a is absolutely prohibited from being overwritten is distinguished based on the overwriting-prohibiting list 32b (especially, "overwriting-prohibiting type"), described later.

Figure 5:
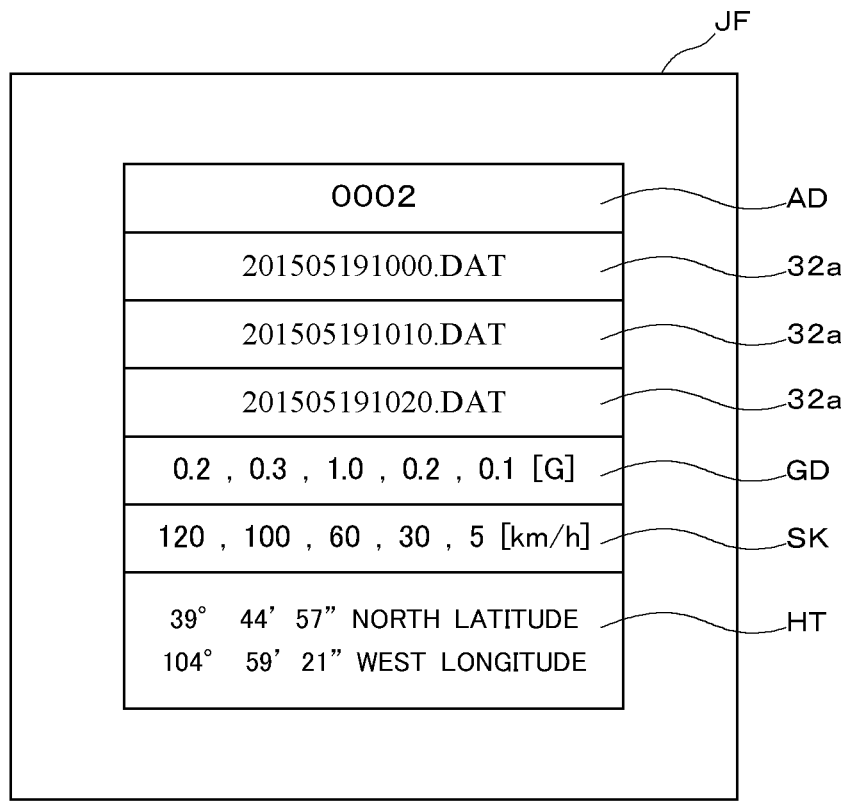
FIG. 5 illustrates an example of a situation data file.

Next, the situation data file will be described. FIG. 5 illustrates an example of a situation data file JF. The situation data file JF is a data set including the moving image file 32a and the like. The situation data file JF is sent to the server 4 and serves as a determination factor of whether or not the moving image file should be absolutely prohibited from being overwritten.

The situation data file JF includes: the address AD showing the location of the storage area of the memory 32; three temporally-continuous moving image files 32a, G values GD including a G value at a moment at which it is decided that the G value has just exceeded a threshold value Th and G values within a predetermined time period before and after the moment at which it is decided that the G value has just exceeded the threshold value Th; a plurality of vehicle speed values SK within a recording time period of the moving image file 32*a*; and a latitude and a longitude HT representing the location of the vehicle 2 at the moment at which it is decided that the G value has just exceeded the threshold value Th. The foregoing data is sent to the server 4 and is looked up, and then serves as the determination factor of whether or not the moving image file should be absolutely prohibited. At least one of the G values GD, the plurality of vehicle speed values SK, the latitude and the longitude HT should be included in the situation data file JF.

<1-4. Overwriting-Prohibiting List>

Next, the overwriting-prohibiting list 32*b* will be described. FIG. 6 illustrates an example of the overwriting-prohibiting list 33*b*. The overwriting-prohibiting list 32*b* is a data table including a plurality of records 33*b*L. A total number of the plurality of records 33*b*L is, for example, 100. Each of the plurality of records 33*b*L includes a data area for the address AD, an overwriting-prohibiting type PD and the G value GD.

The address AD is the identifier showing the location of the storage area of the memory 32 in which the moving image file is stored. The address AD is shown in numbers, for example, "0001" and "0002."

The overwriting-prohibiting type PD shows a recording method for overwriting the moving image file stored in the address AD of the memory 32. There are two types of the recording method for overwriting the moving image file: "absolute prohibition" and "normal prohibition." The absolute prohibition of overwriting the moving image file is a recording method that does not allow overwriting a moving image file even with another moving image file generated afterward showing an occurrence of a greater acceleration. Moreover, the "normal prohibition" of overwriting the moving image file is a recording method that does not allow a moving image file to be overwritten with another moving file generated by normal cyclical recording of the memory 32 but that allows a moving image file to be overwritten with another moving image file generated afterward showing an occurrence of a greater acceleration. For example, up to 10 records are in a record group AR for the absolute prohibition of the overwriting-prohibiting type PD. However, the number of the records may be changed in a range up to the total number of the plurality of records 33*b*L. Moreover, for example, 90 records are in a record group OR for the normal prohibition of the overwriting-prohibiting type PD.

Each of the G values GD is an acceleration detected by the acceleration sensor 23 as an acceleration that occurred to the vehicle 2.

<1-5. Process>

Figure 7:
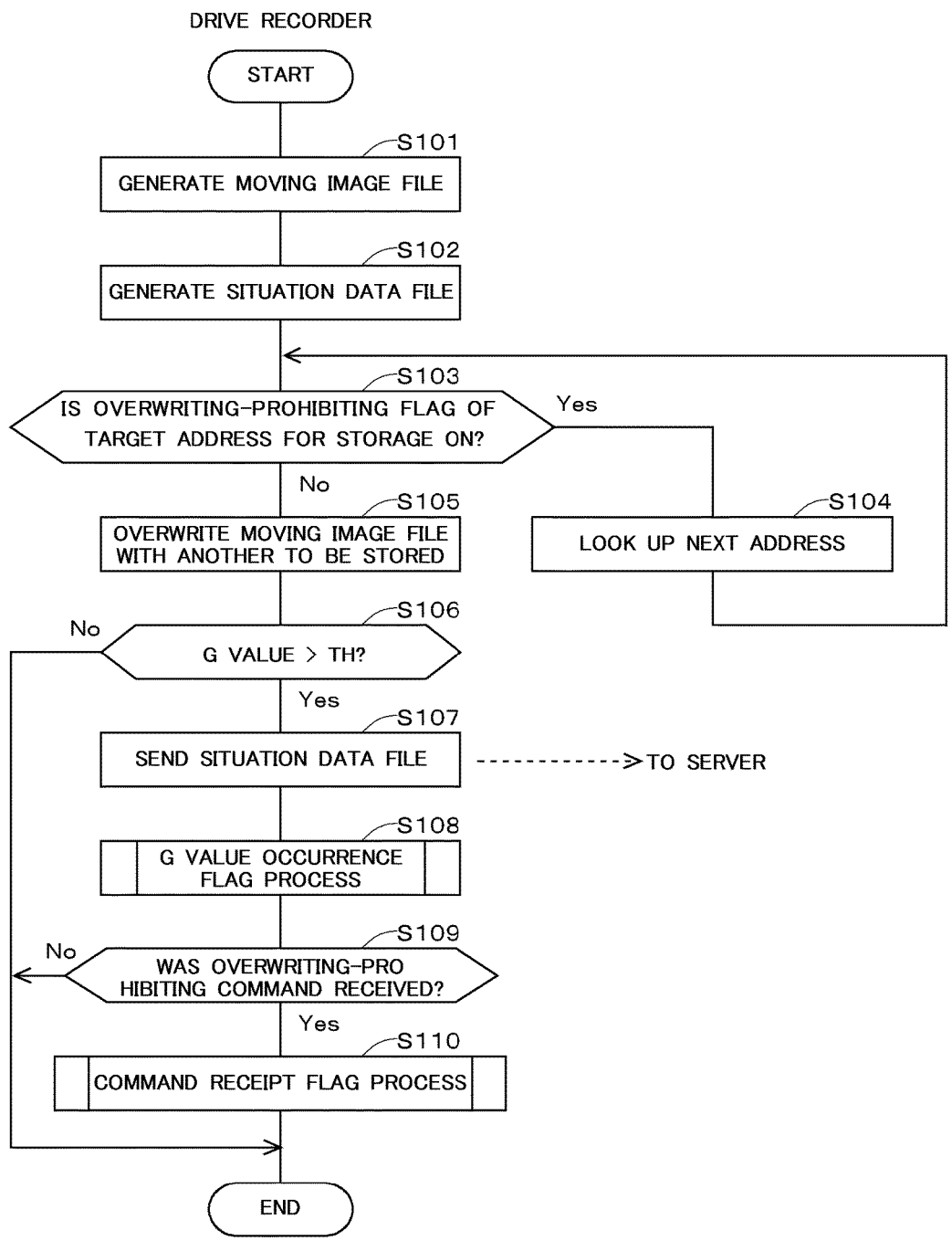
FIG. 7 illustrates a process performed by the drive recorder.
Figure 8:
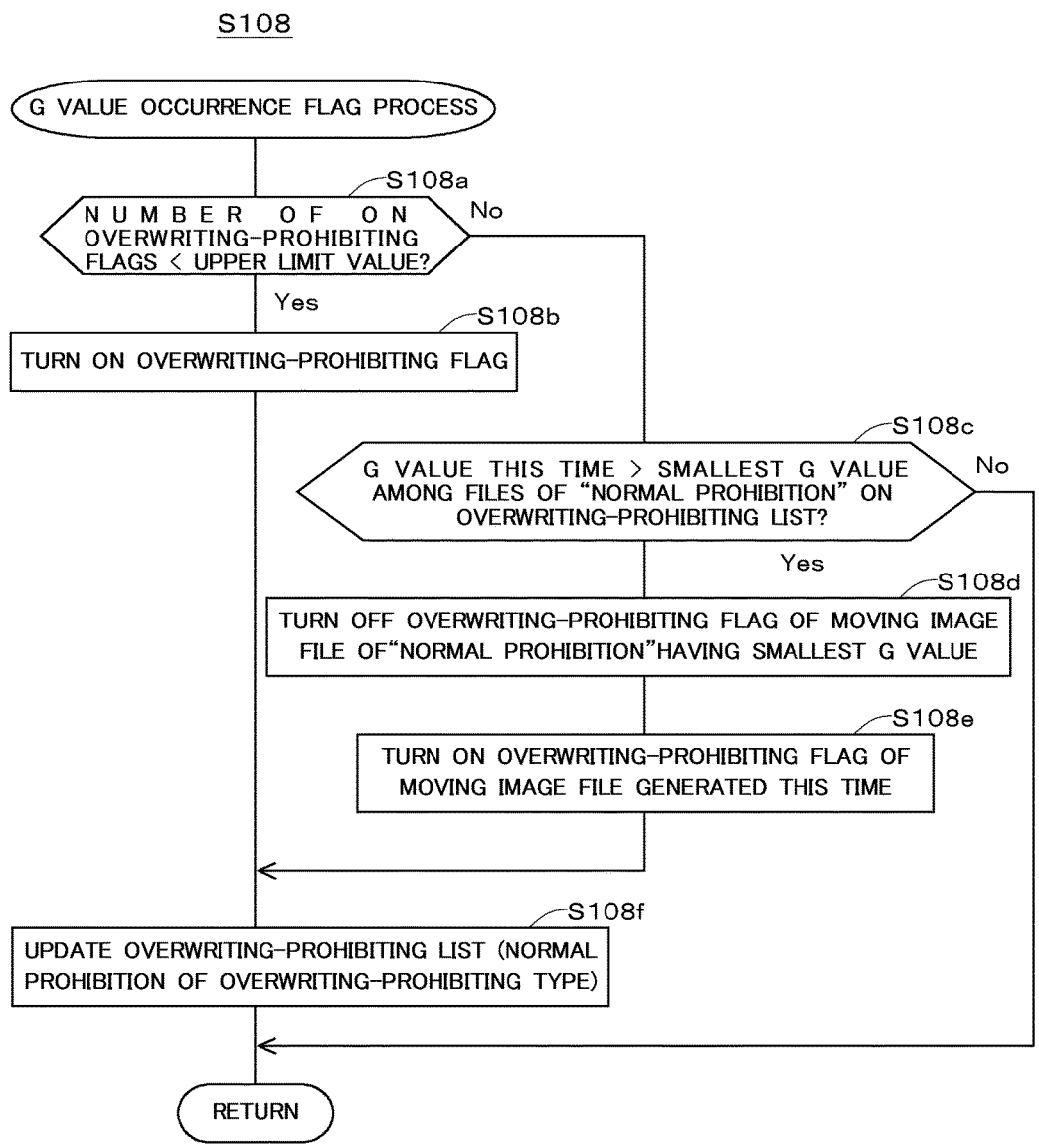
FIG. 8 illustrates a process performed by the drive recorder.
Figure 9:
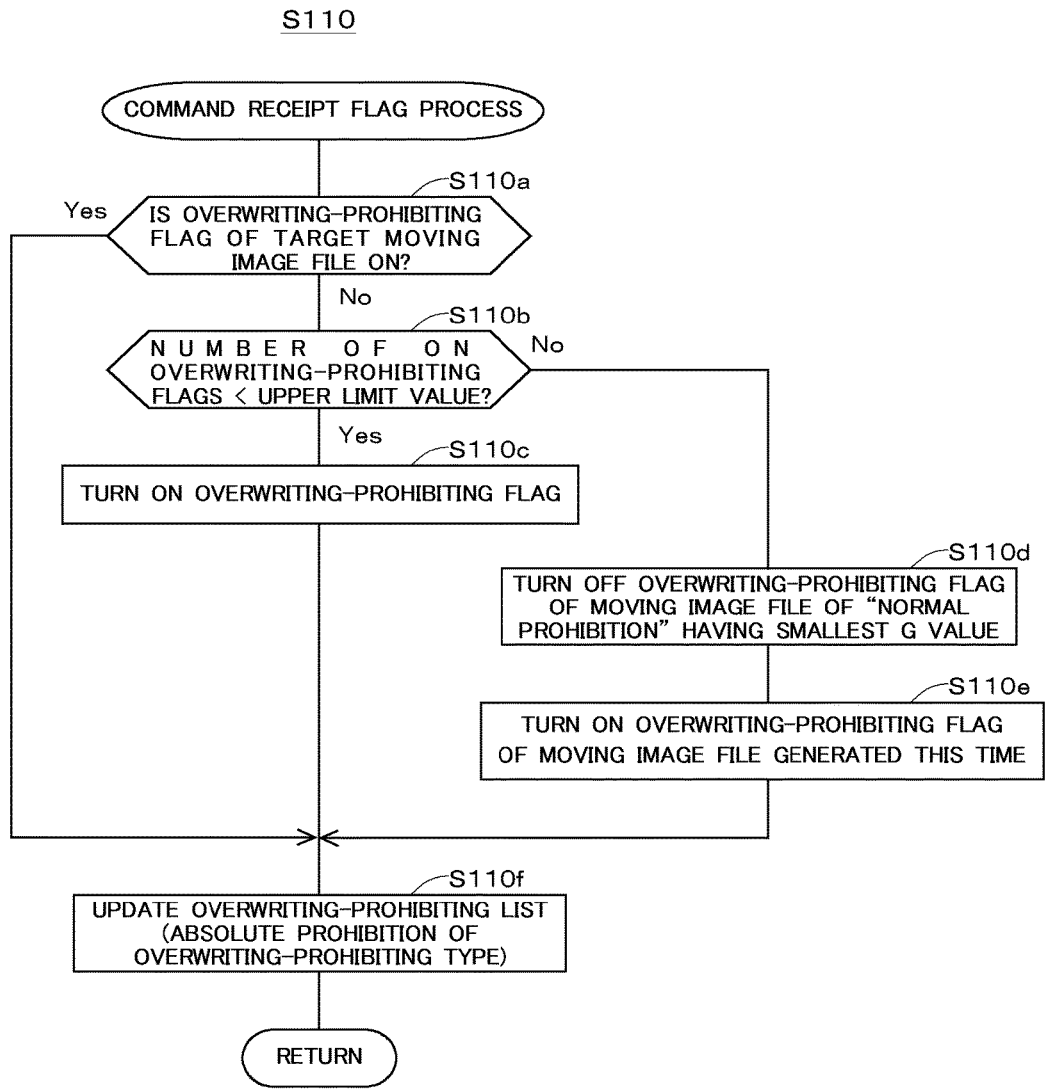
FIG. 9 illustrates a process performed by the drive recorder.

Next, a process performed by the drive recorder 3 will be described. FIG. 7, FIG. 8 and FIG. 9 show flowcharts showing the process performed by the drive recorder 3. The process is repeatedly performed in a predetermined time cycle.

FIG. 7 illustrates a flowchart showing major processing steps performed by the drive recorder 3. First, the data acquiring part 31*a* acquires the data of the plurality of sill images from the camera 22 to generate the moving image file (a step S101).

Next, the data acquiring part 31*a* acquires the acceleration data from the acceleration sensor 23, the vehicle speed data from the vehicle speed sensor 24, the location data from the location detector 25 and the addresses for the plurality of the moving image files from the memory 32. Then, the data acquiring part 31*a* generates the situation data file including the address and the moving image file and at least one of the acceleration data, the vehicle speed, and the location data (a step S102).

Once the data acquiring part 31*a* generates the situation data file, the data recorder 31*b* looks up the address of the memory 32 in which the moving image file generated by the data acquiring part 31*a* should be stored and determines whether or not the overwriting-prohibiting flag is ON (a step S103).

In a case where the data recorder 31*b* determines that the overwriting-prohibiting flag is ON of the address which the data recorder 31*b* looked up (Yes in the step S103), the data recorder 31*b* looks up a next address (a step S104), and determines again whether or not the overwriting-prohibiting flag is ON (the step S103). For example, in a case where an address 0001 is first looked up, an address 0002 is looked up next. The data recorder 31*b* repeats the steps S103 and S104 until the data recorder 31*b* finds an address of which the overwriting-prohibiting flag is not ON, i.e., of which the overwriting-prohibiting flag is OFF.

On the other hand, in a case where the data recorder 31*b* determines that the overwriting-prohibiting flag of the looked-up address is not ON (No in the step S103), the data recorder 31*b* overwrites the stored moving image file with the moving image file generated by the data acquiring part 31*a* and stores the generated moving image file (a step S105).

Next, the event detector 31*c* determines whether or not the G value that occurred to the vehicle 2 exceeds the threshold value Th, based on the acceleration data sent from the acceleration sensor 23 (a step S106). In other words, the event detector 31*c* determines presence or absence of an event that should prohibit the moving image file relating to the event from being overwritten (normal prohibition). The threshold value Th is, for example, 0.8 [G].

In a case where the event detector 31*c* determines the G value does not exceed the threshold value Th (No in the step S106), the process ends. Since the value does not exceed the threshold value Th so that the event did not occur and there is no need to perform the overwriting-prohibiting process.

On the other hand, in a case where the event detector 31*c* determines that the G value exceeded the threshold value Th (Yes in the step S106), the data sender 31*d* sends to the server 4 the situation data file generated by the data acquiring part 31*a* (a step S107). In this case, in addition to the moving image file including an image showing the moment at which the G value exceeded the threshold value Th, the moving image files generated temporally before and after the moment are included in the situation data file. In other words, three moving image files are put into the situation data file. Thus, details including time periods before and after the moment at which the G value exceeded the threshold value Th can be analyzed.

Once the data sender 31*d* sends the situation data file to the server 4, a G value occurrence flag process is performed (a step S108). The G value occurrence flag process is performed to prohibit the corresponding moving image file from being overwritten in a case where the G value exceeded the threshold value Th. The G value occurrence flag process will be described later in detail.

Once the G value occurrence flag process is performed, the determination receiver 31*e* determines whether or not the determination receiver 31*e* received the overwriting-prohibiting command from the server 4 (a step S109).

In a case where the determination receiver 31e determines that the determination receiver 31e did not receive the overwriting-prohibiting command from the server 4 (No in the step S109), the process ends.

On the other hand, in a case where the determination receiver 31e determines that the determination receiver 31e received the overwriting-prohibiting command from the server 4 (Yes in the step S109), a command receipt flag process is performed (a step S110). The command receipt flag process is a process that absolutely prohibits the corresponding moving image file from being overwritten in a case where the determination receiver 31e receives the overwriting-prohibiting command for the moving image file from the server 4. Details of the command receipt flag process will be described later. Once the command receipt flag process is performed, the process ends.

Next, the details of the G value occurrence flag process in the step S108 will be described. FIG. 8 illustrates show a flowchart for steps of the G value occurrence flag process.

Once the G value occurrence flag process begins, the overwriting-prohibiting part 31f looks up the overwriting-prohibiting flag FL of the memory 32 to determine whether or not a number of the overwriting-prohibiting flags that are ON is smaller than an upper limit value (a step S108a). The upper limit number is, for example, 100.

Once determining that the number of the overwriting-prohibiting flag that are ON is smaller than the upper limit value (Yes in the step S108a), the overwriting-prohibiting part 31f turns on the overwriting-prohibiting flag of the corresponding moving image file (a step S108b).

On the other hand, once determining that the number of the overwriting-prohibiting flag that are ON is not smaller than the upper limit value (No in the step S108a), the overwriting-prohibiting part 31f determines whether or not the G value that occurred this time is greater than a G value smallest in the plurality of records 33bL set as the "normal prohibition" of the overwriting-prohibiting type on the overwriting-prohibiting list 32b (a step S108c).

Once the overwriting-prohibiting part 31f determines that the G value that occurred this time is not greater than the G value smallest in the plurality of records 33bL set as the "normal prohibition" (No in the step S108c), the G value occurrence flag process ends. The process returns to the process in FIG. 7, and the step S109 is executed. Since the G value that occurred this time is not greater than the G values already stored (i.e. smaller), the moving image file thereof has little need to be prohibited from being overwritten. Thus, the limited storing area can be effectively used.

On the other hand, once determining that the G value that occurred this time is greater than the G value smallest in the plurality of records 33bL set as the "normal prohibition" (Yes in the step S108c), the overwriting-prohibiting part 31f turns off the overwriting-prohibiting flag FL of one record 32aL having a same address as the record 33bL having the smallest G value in the memory 32 (a step S108d).

Once turning off the overwriting-prohibiting flag FL of the record 32aL having the smallest G value, the overwriting-prohibiting part 31f turns on the overwriting-prohibiting flag FL of the record 32aL including the moving image file generated this time (i.e. a moving image file including the moment at which the G value exceeded the threshold value Th) (a step S108e).

In a case where the overwriting-prohibiting part 31f turns on the overwriting-prohibiting flag FL in the step S108b or in the step S108e, the overwriting-prohibiting part 31f sets the corresponding record 33bL on the overwriting-prohibiting list 32b to the "normal prohibition" of the overwriting-prohibiting type (a step S108f). Then, the overwriting-prohibiting part 31f updates the address AD and the G value GD to an address AD and a G value GD of the moving image file prohibited from being overwritten this time. In a case where the plurality of the G values are looked up, a greatest G value is adopted because the G value most clearly shows an incident that occurred to the vehicle 2.

Once the overwriting-prohibiting part 31f updates the overwriting-prohibiting list 33b, the process returns to the process in FIG. 7 and the step S109 is executed.

Since the G value occurrence flag process described above is performed, the moving image file including a greater G value can be prohibited from being overwritten. At the same time, since the number of the moving image files prohibited from being overwritten does not exceed the upper limit value, the limited storage area can be effectively used.

Next, the command receipt flag process in the step S110 will be described in detail. FIG. 9 illustrates a flowchart showing steps of the command receipt flag process.

Once the command receipt flag process is performed, the overwriting-prohibiting part 31f looks up the overwriting-prohibiting flag FL of a target moving image file in the memory 32 to determine whether or not the overwriting-prohibiting flag thereof is ON (a step S110a) because there is a case where the overwriting-prohibiting flag of the target moving image file is ON at this moment. In other words, in the step S108c of the G value occurrence flag process (the step S108), if the G value that occurred this time is determined not to be greater than the other G values, the overwriting-prohibiting flag of the moving image file is turned off, instead of being turned on. Therefore, in the step S110a, the overwriting-prohibiting part 31f needs to loop up the overwriting-prohibiting flag FL of the target moving image file in the memory 32 to determine whether or not the overwriting-prohibiting flag is ON.

In a case where the overwriting-prohibiting part 31f determines that the overwriting-prohibiting flag is ON (Yes in the step S110a), the overwriting-prohibiting part 31f performs a process in a step S110f. The process in the step S110f will be described later.

On the other hand, in the case where the overwriting-prohibiting part 31f determines that the overwriting-prohibiting flag is not ON (No in the step S110a), the overwriting-prohibiting part 31f determines whether or not the number of the overwriting-prohibiting flag that is ON is smaller than the upper limit value (a step S110b). The upper limit value is, for example, 100.

In a case where the overwriting-prohibiting part 31f determines that the number of the overwriting-prohibiting flags that is ON is smaller than the upper limit value (Yes in the step S110b), the overwriting-prohibiting part 31f turns on the overwriting-prohibiting flag of the target moving image file (a step 110c). Thus, in the step S108c of the G value occurrence flag process (S108), the overwriting-prohibiting part 31f can turn on the overwriting-prohibiting flag that is OFF of the moving image file.

On the other hand, the overwriting-prohibiting part 31f turns off the overwriting-prohibiting flag FL of one records 32aL having a same address in the memory 32 as an address of the G value smallest in the plurality of records 33bL set as the "normal prohibition" of the overwriting-prohibiting type on the overwriting-prohibiting list 32b (a step S110d). Being different from the foregoing G value occurrence flag process, the overwriting-prohibiting part 31f does not determine whether or not the G value that occurred this time is greater than the G value smallest in the plurality of records 33bL set as the "normal prohibition" because the server 4 determines that the record is the "absolute prohibition" so that the record should be prohibited from being overwritten regardless of whether the G value is large or small.

Once turning off the overwriting-prohibiting flag FL having the smallest G value, the overwriting-prohibiting part 31*f* turns on the overwriting-prohibiting flag FL of the record 32*a*L including the moving image file generated this time (a step S110*e*).

In a case where the overwriting-prohibiting part 31*f* determines in the foregoing step S110*a* that the overwriting-prohibiting flag is ON (Yes in the step S110*a*) or in a case where the overwriting-prohibiting part 31*f* turns on the overwriting-prohibiting flag FL in the step S110*c* and in the step S110*e*, the overwriting-prohibiting part 31*f* sets the target record 33*b*L on the overwriting-prohibiting list 32*b* to the "absolute prohibition" of the overwriting-prohibiting type (a step S110*f*). Then, the overwriting-prohibiting part 31*f* updates the address AD and the G value GD to an address and a G value of the moving image file prohibited from being overwritten this time. In a case where a plurality of the G values are looked up, a largest G value is used because the largest G value most clearly shows an incident that happened to the vehicle 2.

Once the overwriting-prohibiting part 31*f* updates the overwriting-prohibiting list 33*b*, the process returns to the process in FIG. 7 and ends.

As described above, the command receipt flag process is performed so that the moving image file that is very important for later validation can be absolutely prohibited from being overwritten. Once a moving image file is absolutely prohibited from being overwritten, the moving image file is not overwritten with another file having any G value. Therefore, a truly important moving image file can be effectively stored. Moreover, only such a moving image file is absolutely prohibited from being overwritten so that the limited storage area can be effectively used.

Figure 10:
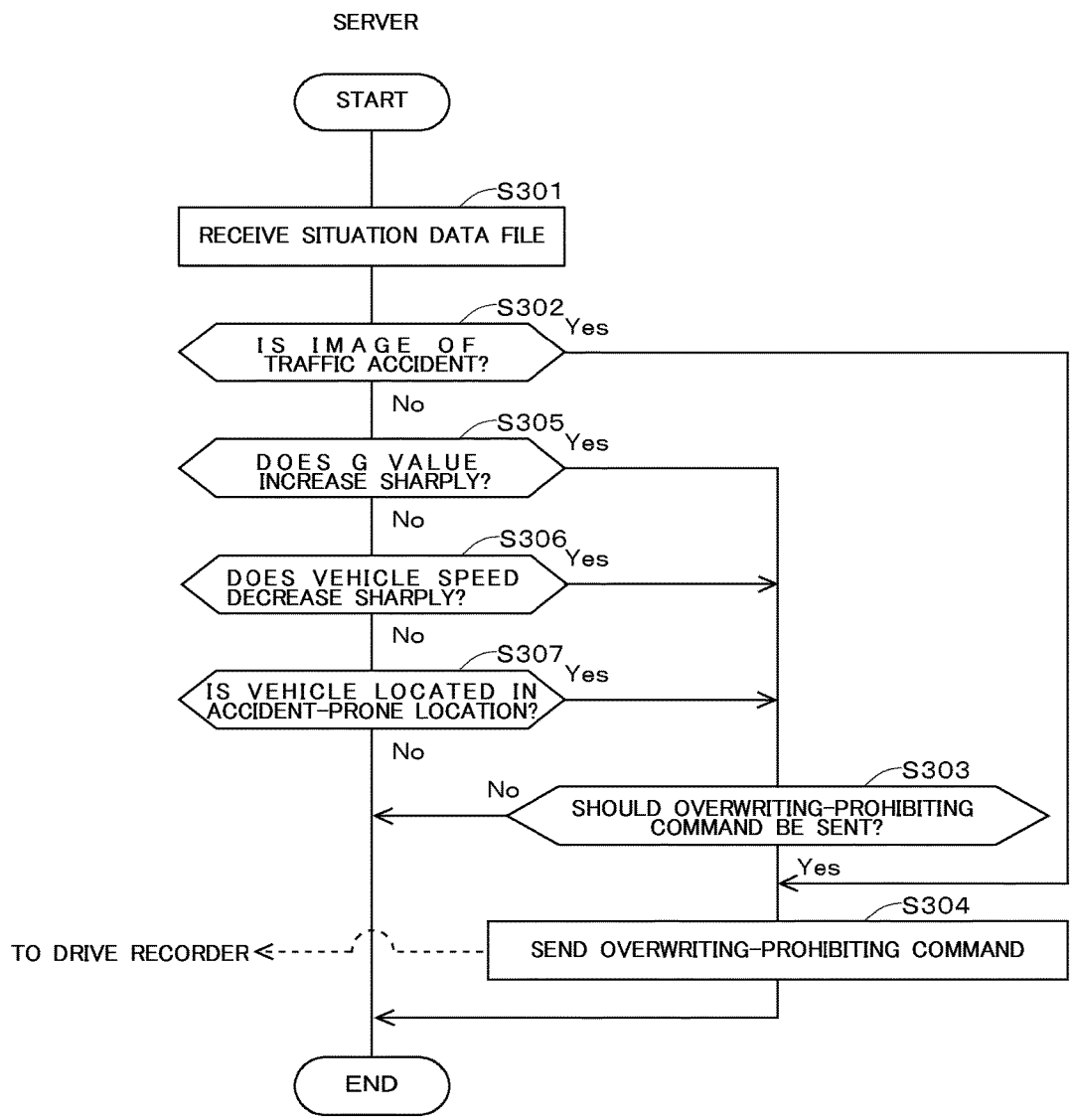
FIG. 10 illustrates a process performed by the server.

Next, processing steps performed by the server 4 will be described. FIG. 10 illustrates a flowchart of a process performed by the server 4. Moreover, the process is repeated in a predetermined cycle.

First, the data receiver 41*a* receives the situation data file sent from the drive recorder 3 (a step S301).

Once the data receiver 41*a* receives the situation data file, the image analyzer 41*b* analyzes the moving image file included in the situation data file and determines whether or not the moving image file includes an image relating to a traffic accident (a step S302). The image analyzer 41*b*, as described above, analyzes the moving image file, using a well-known image processing method, such as pattern matching.

In a case where the image analyzer 41*b* determines that the moving image file includes an image relating to a traffic accident (Yes in the step S302), the command sender 41*e* sends the overwriting-prohibiting command to the drive recorder 3 (a step S304). Thus, the moving image file including the image relating to the traffic accident can be prohibited from being overwritten. Especially, the process for the absolute prohibition of overwriting the moving image file can be performed. Since the image relating to the traffic accident and the like in the moving image file is every important for later verification, it is recommended to send the overwriting-prohibiting command to the drive recorder 3.

On the other hand, in a case where the image analyzer 41*b* determines that the moving image file does not include an image relating to a traffic accident (No in the step S302), the data analyzer 41*c* looks up the G value in the situation data file to determine whether or not the G value increases sharply (a step S305). A sharp increase in the G value may represent a sudden braking, a collision accident, etc. Therefore, there is a high possibility that the moving image file should be prohibited from being overwritten. By determining whether or not the G value sharply increased, it is possible to prohibit from being overwritten the moving image file having a high possibility of necessity to be prohibited from being overwritten but is not prohibited from being overwritten in the image analysis. As compared to the case whether the G value is greater or smaller than the threshold value is simply determined, behaviors of the vehicle 2 can be more accurately determined by analyzing a sharp increase in the G value, i.e. changing ratio of the G value. Once sending the overwriting-prohibiting command, the moving image file is absolutely prohibited from being overwritten. Therefore, the determination should be made more carefully than the process for the normal prohibition of overwriting the moving image file. However, the analysis of the changing ratio of the G value needs computational power greater than the determination of whether the G value is greater or smaller than the threshold value. Thus, it is recommended that the computation should be performed by a server, a large-scale computing apparatus, instead of a vehicle-mounted apparatus only, because a computation result can be derived faster and more accurately.

In a case where the data analyzer 41*c* determines that the G value sharply increases (Yes in the step S305), the determination part 41*d* looks up the analysis result analyzed by the image analyzer 41*b* and other data (vehicle speed and/or location of the vehicle 2) included in the situation data file to determine whether or not the overwriting-prohibiting command should be sent to the drive recorder 3 (a step S303). In this case, the determination part 41*d* looks up other data included in the situation data file to determine whether or not the overwriting-prohibiting command should be send to the drive recorder 3. In other words, in addition to a determination result representing that an image relating to a traffic accident or the like is included in the moving image file, in consideration of the G value, the vehicle speed and the location of the vehicle 2, whether or not the overwriting-prohibiting command needs to be sent is finally determined. Whether or not the overwriting-prohibiting command needs to be sent is finally determined based on not only single data but also a plurality of data. Thus, a truly necessary moving image file can be prohibited from being overwritten and, at the same time, it is possible to avoid prohibiting, from being overwritten, a moving image file not to be prohibited when being viewed from multiple viewpoints, although the moving image file that should be seemingly prohibited from being overwritten when being viewed from one viewpoint. Thus, the storage area of the memory 32 can be effectively used. In other words, the image analyzer 41*b* makes a determination that the moving image file includes an image relating to a traffic accident or the like. However, the determination serves only as a trigger for starting the determination of whether or not the overwriting-prohibiting command should be sent, and the determination part 41*d* makes a final comprehensive determination, considering other data, too, about whether or not the overwriting-prohibiting command should be sent. The determination part 41*d* may have separate conditions using a plurality of data, for the determination. One example of the conditions for the determination is: the G value is 1.5 [G] or more; the vehicle speed is 80 km/h or more; the vehicle 2 is located in a traffic intersection; and also an image relating to a traffic accident is included in the moving image file.

In a case where the determination part 41d determines that the overwriting-prohibiting command should be sent to the drive recorder 3 (Yes in the step S303), the command sender 41e sends the overwriting-prohibiting command (the step S304). On the other hand, in a case where the determination part 41d determines that the overwriting-prohibiting command should not be sent to the drive recorder 3 (No in the step S303), the command sender 41e does not send the overwriting-prohibiting command and the process ends.

In the step S305, in a case where the data analyzer 41c determines that the G value does not increase sharply (No in the step S305), the data analyzer 41c determines whether or not the vehicle speed decreases sharply (a step S306). A sharp decrease in the vehicle speed may represent a sudden braking or a collision accident, etc. Therefore, there is a high possibility that the moving image file should be prohibited from being overwritten. By determining whether or not the vehicle speed decreases sharply, it is possible to prohibit from being overwritten the moving image file having a high possibility that the moving image file should be prohibited from being overwritten but is not prohibited from being overwritten, in the image analysis and the G value analysis.

In a case where the data analyzer 41c determines that the vehicle speed sharply decreases (Yes in the step S306), the determination part 41d looks up the analysis result analyzed by the image analyzer 41b and other data (G value and/or location of the vehicle 2) included in the situation data file to determine whether or not the overwriting-prohibiting command should be sent to the drive recorder 3 (the step S303). The reason why the analysis result and the other data are looked up is as described above.

In the case where the determination part 41d determines that the overwriting-prohibiting command should be sent (Yes in the step S303), the command sender 41e sends the overwriting-prohibiting command (the step S304). In the case where the determination part 41d determines that the overwriting-prohibiting command should not be sent (No in the step S303), the process ends.

In the step S306, in a case where the data analyzer 41c determines that the vehicle speed does not decrease sharply (No in the step S306), the data analyzer 41c determines whether or not the vehicle 2 is located in a traffic intersection, an accident-prone location or the like (a step S307). In a case where the vehicle 2 is located in the traffic intersection, the accident-prone location or the like, the vehicle 2 may be in an accident. Therefore, there is a high possibility that the moving image file should be prohibited from being overwritten. By determining whether or not the vehicle 2 is located in the traffic intersection, the accident-prone location or the like, it is possible to prohibit from being overwritten the moving image file having a high possibility that the moving image file should be prohibited from being overwritten but is not prohibited from being overwritten in the image analysis, the G value analysis and the vehicle speed analysis. The data analyzer 41c looks up the situation data file for the map data 42b and a latitude and a longitude in which the vehicle 2 is located to determine whether or not the vehicle 2 is located in a traffic intersection, an accident-prone location or the like.

In a case where the data analyzer 41c determines that the vehicle 2 is located in the accident-prone location (Yes in the step S307), the determination part 41d looks up the analysis result analyzed by the image analyzer 41b and other data (G value and/or vehicle speed) included in the situation data file to determine whether or not the overwriting-prohibiting command should be sent to the drive recorder 3 (the step S303). The reason why the analysis result and the other data are looked up is as described above.

In the case where the determination part 41d determines that the overwriting-prohibiting command should be sent (Yes in the step S303), the command sender 41e sends the overwriting-prohibiting command (the step S304). In the case where the determination part 41d determines that the overwriting-prohibiting command should not be sent (No in the step S303), the process ends.

In the step S307, in a case where the data analyzer 41c determines that the vehicle 2 is not located in a traffic intersection, an accident-prone location or the like (No in the step S307), the process ends.

As described above, it is recommended that whether or not the moving image file should be prohibited from being overwritten or especially should be absolutely prohibited from being overwritten should be determined based on a plurality of data, not based on single data, including temporal progress, rather than being smaller or greater than the threshold value because if an image data file is absolutely prohibited from being overwritten, the storage area thereof in the memory 32 cannot be overwritten for use so that careful determination is required. Moreover, since high computational power is required for the determination based on the plurality of data and the temporal progress of the data, it is recommended that the large-scale computation should be performed by a server, a large-scale computing apparatus, not by a single vehicle-mounted apparatus.

As described above, the drive recorder 3 in this embodiment sends to the server 4 the moving image files showing the situation around the vehicle 2 when a large acceleration occurred. The server 4 determines, based on the moving image file, whether or not to prohibit from being overwritten the moving image file showing the situation around the vehicle 2 in a moment at which an event occurred and/or before and after the event. Then, based on the determination result, the drive recorder 3 prohibits from being overwritten the image data in the moment at which the event occurred and/or before and after the event. Thus, the image data that should be prohibited from being overwritten is surely prohibited from being overwritten and also allows overwriting image data that does not necessarily need to be prohibited from being overwritten. Thus, the storage area (memory capacity) can be effectively used.

Moreover, the situation data that is sent to the server 4 includes at least one of the acceleration, the speed and the location of the vehicle 2 in the moment at which an event occurred and/or before and after the event. Since the server 4 analyzes behaviors of the vehicle 2, it is possible to improve accuracy of determination of whether or not the moving image file should be prohibited from being overwritten.

Moreover, the situation data that is sent to the server 4 includes the moving image file. Thus, the server 4 can determine whether or not to prohibit the moving image file from being overwritten, by directly analyzing moving images. Since directly analyzing the moving images that may be prohibited from being overwritten, the drive recorder 3 can accurately prohibit the moving image file from being overwritten.

2. Modification

The embodiment of the invention is described above. However, the invention is not limited to the foregoing embodiment and various modifications are possible. Some of those modifications will be described below. Any form in the foregoing embodiments and the modifications described below may be arbitrarily combined with one another.

Figure 11:
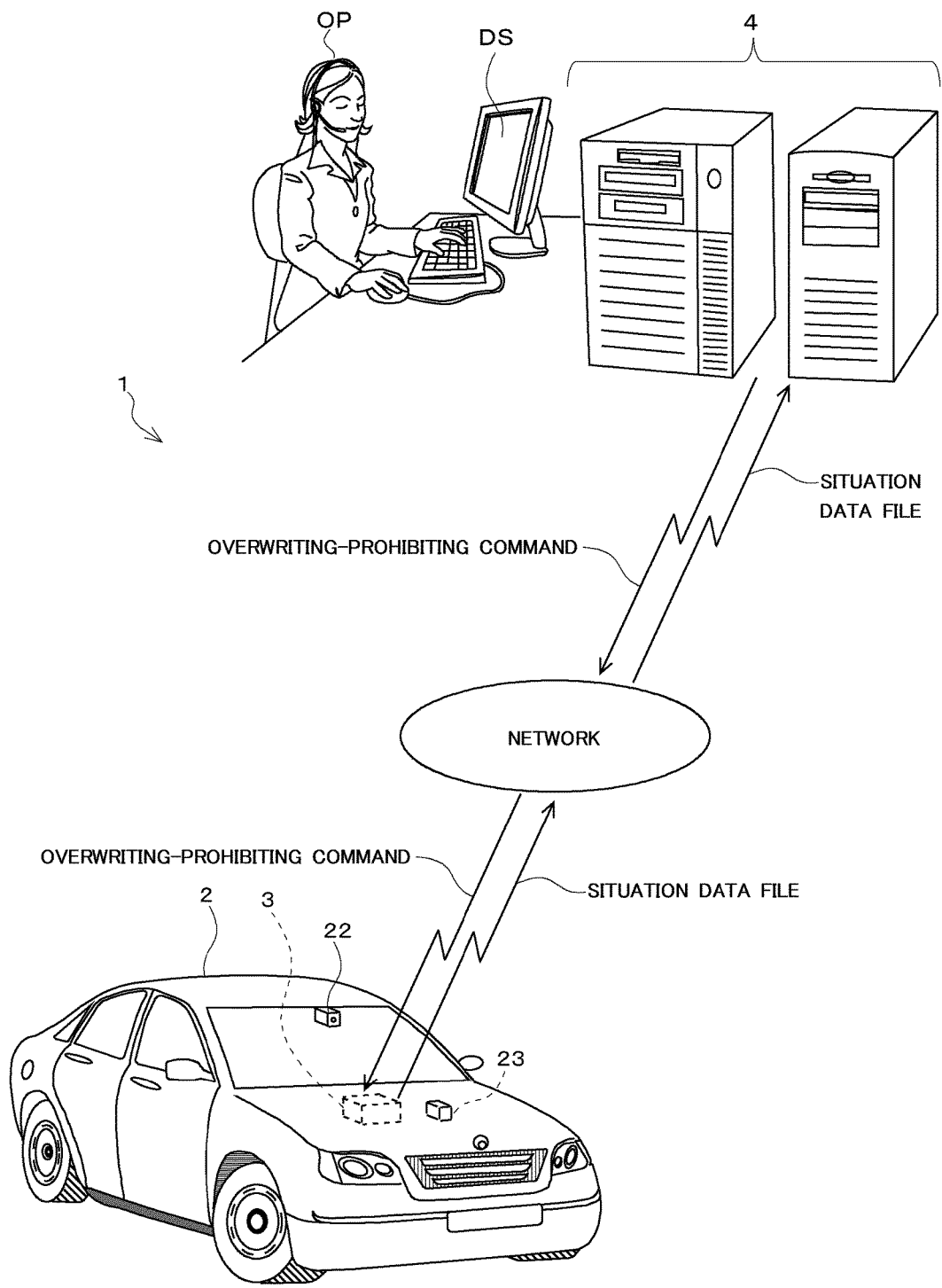
FIG. 11 illustrates a modification of the data recording system.

In the foregoing embodiment, the server 4 performs pattern matching processing and other image processing for the moving image file included in the situation data file sent from the drive recorder to determine whether or not the file should be prohibited from being overwritten. However, the server 4 may not determine whether or not the file should be prohibited from being overwritten. Moreover, whether or not the file should be prohibited from being overwritten may be determined by a person watching moving images (or still images). FIG. 11 illustrates an example of a modification of a data recording system. The server 4 causes the moving image file received from the drive recorder to be displayed on a display DS. An operator OP of the server 4 watches the moving images (or still images) to determine whether or not the moving image file should be prohibited from being overwritten. In this case, since a situation of a traffic accident and the like can be examined based on experiences and sensitivity of the person, it is possible to improve accuracy of determination of whether or not to prohibit the moving image file from being overwritten, as compared to mechanical image processing, such as pattern matching.

In the foregoing embodiment, the moving image file including a moment at which a G value occurred is prohibited from being overwritten. However, moving image files temporally before and after the moving image file including the moment at which the G value occurred may also be prohibited from being overwritten. In this case, a cause of the G value can be easily analyzed even if the moment at which the G value occurred starts immediately after the moving image file starts or immediately before the moving image file ends.

In the foregoing embodiment, the moving image file is prohibited from being overwritten, triggered by an occurrence of an acceleration. However, the moving image file may be prohibited from being overwritten, triggered by a change of the vehicle speed or occurrence of any event.

In the foregoing embodiment, the G value greater than the threshold value Th is a condition to determine that an event occurred. However, another element, not the G value, may be defined as a condition to determine that the event occurred. For example, a switch is provided, and thus a user's operation with the switch may be a condition to determine that the event occurred. In this case, the user can control whether or not the event occurred.

In the foregoing embodiment, the drive recorder 3 selects the moving image file that should be determined whether or not to be prohibited from being overwritten. However, the server 4 may select the moving image file that should be determined whether or not to be prohibited from being overwritten. In this case, the drive recorder 3 sends all generated moving image files to the server 4.

In the foregoing embodiment, the server 4 outside the vehicle determines the moving image file that should be prohibited from being overwritten. However, instead of the server 4, an apparatus in the vehicle may determine the moving image file that should be prohibited from being overwritten. For example, a car navigation system may determine the moving image file. However, it is recommended to us an apparatus having a relatively high processing capability because the image processing and the like need high computational power. There is no interference with control of the navigation system and the like if the image processing is performed in the intervals of CPU calculation or by use of remaining power.

In the foregoing embodiment, the acceleration data acquired by the acceleration sensor is used. However, another data may be used: for example, data acquired by a periphery monitoring sensor, such as a millimeter wave radar, an infrared radar and clearance sonar; data acquired by an operation control sensor, such as a break sensor, an acceleration location sensor and a gear lever; and data acquired by a sensor for a safety control device, such as an air bag, a seatbelt and a door lock.

In the foregoing embodiment, the situation data file includes the moving image file, the acceleration, the vehicle speed and the location data. However, other data may be included. Some examples of the other data are engine revolutions, a travelling distance this time, a number and weight of luggage and number of occupants (passengers), etc. If the travelling distance this time is considered, a fatigue level of the driver can be measured. If the number and the weight of luggage are looked up, a stable travelling level of the vehicle can be measured.

In the foregoing embodiment, a vehicle, such as an automobile, is described as a moving object. However, this invention may be used for another moving object, such as an airplane, a ship, a vessel, a boat and a train. Moreover, the moving object may be an unmanned moving object.

Functions described as a single block in the foregoing embodiment are not necessarily implemented by a single physical element, but may be implemented by separate physical elements. Also, functions described as a plurality of blocks in the foregoing embodiment may be implemented by a single physical element. Also, one function may be shared by the apparatuses in the vehicle and outside the vehicle to implement a process, as a whole, relating to the one function by sharing and exchanging information among those apparatuses via communications.

Moreover, in the foregoing embodiment, any or all of the functions described to be implemented by software by executing programs may be implemented by electrical hardware circuit, and any or all of the functions described to be implemented by electrical hardware circuit may be implemented by software. Also, the function described as one block in the foregoing embodiment may be implemented by the cooperation of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A drive recorder that temporally continuously records and stores image data sets into a memory, each of the image data sets showing surroundings of a vehicle, the drive recorder comprising a microcomputer configured to function as:

an acquiring part that sequentially acquires the image data sets;

a recorder that overwrites one of a plurality of the image data sets previously stored in the memory with a newly acquired image data set newly acquired by the acquiring part to store the newly acquired image data set into the memory, the one image data set having been designated as not prohibited from being overwritten;

a detector that detects whether there was an occurrence of an event in association with the newly acquired image data set;

a sender that, when the occurrence of the event is detected to have occurred in association with the newly acquired image data set, sends situation data showing 1) a situation in a moment at which the event occurred or 2) a situation optionally before and/or after the event occurred including the moment at which the event occurred, to an external apparatus that is located outside the vehicle;

a receiver that receives, from the external apparatus, a determination result determined by the external apparatus based on the situation data, the determination result indicating whether or not to prohibit the newly acquired image data set from being overwritten; and a prohibiting part that prohibits the newly acquired image data set from being overwritten in the future, based on the determination result received from the external apparatus that is located outside the vehicle.

2. The drive recorder according to claim 1, wherein the situation data includes at least one of an acceleration, a speed and a location of the vehicle 1) in the moment at which the event occurred or 2) optionally before and/or after the event occurred including the moment at which the event occurred.

3. The drive recorder according to claim 1, wherein the situation data includes the newly acquired image data set.

4. A data recording system comprising:
a drive recorder that records and stores image data sets showing surroundings of a vehicle; and
a server that is located outside the vehicle, wherein
the drive recorder includes a microcomputer configured to function as:
an acquiring part that sequentially acquires the image data sets;
a recorder that overwrites one of a plurality of the image data sets previously stored in a memory with a newly acquired image data set newly acquired by the acquiring part to store the newly acquired image data set into the memory, the one image data set having been designated as not prohibited from being overwritten;
a detector that detects whether there was an occurrence of an event in association with the newly acquired image data set;
a sender that, when the occurrence of the event is detected to have occurred in association with the newly acquired image data set, sends situation data showing 1) a situation in a moment at which the event occurred or 2) a situation optionally before and/or after the event occurred including the moment at which the event occurred, to the server;
a receiver that receives, from the server, a determination result determined by the server based on the situation data, the determination result indicating whether or not to prohibit the newly acquired image data set from being overwritten; and
a prohibiting part that prohibits the newly acquired image data set from being overwritten in the future, based on the determination result received from the server that is located outside the vehicle, and wherein
the server is configured to function as:
a determining part that determines the determination result, based on the situation data, whether or not to prohibit the newly acquired image data set from being overwritten; and
a result sender that sends the determination result determined by the determining part to the drive recorder.

5. The data recording system according to claim 4, wherein
the situation data includes at least one of an acceleration, a speed and a location of the vehicle 1) in the moment at which the event occurred or 2) optionally before and/or after the event occurred including the moment at which the event occurred.

6. The data recording system according to claim 4, wherein
the situation data includes the newly acquired image data set.

7. A data recording method for temporally continuously recording and storing image data sets into a memory, each of the image data sets showing surroundings of a vehicle, the data recording method comprising the steps of:
(a) sequentially acquiring, by a microcomputer, the image data sets;
(b) overwriting, by the microcomputer, one of a plurality of the image data sets previously stored in the memory with a newly acquired image data set newly acquired by the step (a) to store the newly acquired image data set into the memory, the one image data set having been designated as not prohibited from being overwritten;
(c) detecting, by the microcomputer, whether or not there was an occurrence of an event in association with the newly acquired image data set;
(d) when the occurrence of the event is detected to have occurred in association with the newly acquired image data set, sending, by the microcomputer, situation data showing 1) a situation in a moment at which the event occurred or 2) a situation optionally before and/or after the event occurred including the moment at which the event occurred, to an external apparatus that is located outside the vehicle;
(e) receiving, by the microcomputer, from the external apparatus, a determination result determined by the external apparatus based on the situation data, the determination result indicating whether or not to prohibit the newly acquired image data set from being overwritten; and
(f) prohibiting, by the microcomputer, the newly acquired image data set from being overwritten in the future, based on the determination result received from the external apparatus that is located outside the vehicle.

8. The data recording method according to claim 7, wherein
the situation data includes at least one of an acceleration, a speed and a location of the vehicle 1) in the moment at which the event occurred or 2) optionally before and/or after the event occurred including the moment at which the event occurred.

9. The data recording method according to claim 7, wherein
the situation data includes the newly acquired image data set.

10. A non-transitory computer-readable recording medium that stores a program to be executed by a microcomputer for recording and storing image data sets showing surroundings of a vehicle, the program causing the microcomputer to execute the steps of:
(a) sequentially acquiring the image data sets;
(b) overwriting one of a plurality of the image data sets previously stored in a memory with a newly acquired image data set newly acquired by the step (a) to store the newly acquired image data set into the memory, the one image data set having been designated as not prohibited from being overwritten;
(c) detecting whether or not there was an occurrence of an event in association with the newly acquired image data set;

(d) when the occurrence of the event is detected to have occurred in association with the newly acquired image data set, sending situation data showing 1) a situation in a moment at which the event occurred or 2) a situation optionally before and/or after the event occurred including the moment at which the event occurred, to an external apparatus that is located outside the vehicle;

(e) receiving, from the external apparatus, a determination result determined by the external apparatus based on the situation data, the determination result indicating whether or not to prohibit the newly acquired image data set from being overwritten; and (f) prohibiting the newly acquired image data set from being overwritten in the future, based on the determination result received from the external apparatus that is located outside the vehicle.

11. The recording medium according to claim 10, wherein the situation data includes at least one of an acceleration, a speed and a location of the vehicle 1) in the moment at which the event occurred or 2) optionally before and/or after the event occurred including the moment at which the event occurred.

12. The recording medium according to claim 10, wherein the situation data includes the newly acquired image data set.

* * * * *